United States Patent
Zhang et al.

(10) Patent No.: US 11,243,441 B2
(45) Date of Patent: Feb. 8, 2022

(54) DISPLAY PANEL, DISPLAY APPARATUS, METHOD OF FABRICATING DISPLAY PANEL, AND OPERATING METHOD OF OPERATING DISPLAY PANEL

(71) Applicants: Hefei BOE Display Technology Co., Ltd., Anhui (CN); BOE Technology Group Co., Ltd., Beijing (CN)

(72) Inventors: Lin Zhang, Beijing (CN); Ke Dai, Beijing (CN); Hongliang Wang, Beijing (CN)

(73) Assignees: Hefei BOE Display Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 187 days.

(21) Appl. No.: 16/626,865

(22) PCT Filed: May 14, 2019

(86) PCT No.: PCT/CN2019/086838
§ 371 (c)(1),
(2) Date: Dec. 26, 2019

(87) PCT Pub. No.: WO2020/077990
PCT Pub. Date: Apr. 23, 2020

(65) Prior Publication Data
US 2021/0333599 A1 Oct. 28, 2021

(30) Foreign Application Priority Data
Oct. 18, 2018 (CN) .......................... 201811217750.9

(51) Int. Cl.
*G02F 1/1339* (2006.01)
*G02F 1/1333* (2006.01)

(52) U.S. Cl.
CPC ...... *G02F 1/13394* (2013.01); *G02F 1/13398* (2021.01); *G02F 1/133345* (2013.01)

(58) Field of Classification Search
None
See application file for complete search history.

(56) References Cited

U.S. PATENT DOCUMENTS

| | | | |
|---|---|---|---|
| 2005/0030471 A1* | 2/2005 | Liou | G02F 1/1343 349/190 |
| 2014/0240648 A1 | 8/2014 | Zhao et al. | |

(Continued)

FOREIGN PATENT DOCUMENTS

| | | | |
|---|---|---|---|
| CN | 101551558 A | * | 10/2009 |
| CN | 101551558 A | | 10/2009 |

(Continued)

OTHER PUBLICATIONS

Translation of CN101551558A (Year: 2009).*

(Continued)

*Primary Examiner* — Phu Vu
(74) *Attorney, Agent, or Firm* — Intellectual Valley Law, P.C.

(57) ABSTRACT

A display panel having a display area and a peripheral area is provided. The display panel includes a first display substrate; a second display substrate facing the first display substrate; a sealant layer in the peripheral area and between the first display substrate and the second display substrate, configured to seal the first display substrate and the second display substrate together to form a cell; and an elastic support layer in the peripheral area and between the first display substrate and the second display substrate. The elastic support layer encircled by the sealant layer and spaced apart from the sealant layer. The elastic support layer substantially surrounds the display area. The elastic support layer is configured to be in direct contact with the first (Continued)

display substrate and in direct contact with the second display substrate.

19 Claims, 9 Drawing Sheets

(56) References Cited

U.S. PATENT DOCUMENTS

2015/0185549 A1* 7/2015 Jeon .................. G02F 1/133512
349/106
2017/0343842 A1 11/2017 Yan et al.

FOREIGN PATENT DOCUMENTS

| CN | 102650771 A | 8/2012 |
| CN | 105137668 A | 12/2015 |
| CN | 105892160 A | 8/2016 |
| KR | 20060073808 A | 6/2006 |

OTHER PUBLICATIONS

International Search Report & Written Opinion dated Aug. 21, 2019, regarding PCT/CN2019/086838.
First Office Action in the Chinese Patent Application No. 201811217750.9, dated Nov. 13, 2019; English translation attached.

* cited by examiner

DISPLAY PANEL, DISPLAY APPARATUS, METHOD OF FABRICATING DISPLAY PANEL, AND OPERATING METHOD OF OPERATING DISPLAY PANEL

CROSS-REFERENCE TO RELATED APPLICATION

This application is a national stage application under 35 U.S.C. § 371 of International Application No. PCT/CN2019/086838, filed May 14, 2019, the contents of which are incorporated by reference in the entirety.

CROSS-REFERENCE TO RELATED APPLICATION

This application claims priority to Chinese Patent Application No. 201811217750.9, filed Oct. 18, 2018, the contents of which are incorporated by reference in the entirety.

TECHNICAL FIELD

The present invention relates to display technology, more particularly, to a display panel, a display apparatus, a method of fabricating a display panel, and an operating method of operating a display panel.

BACKGROUND

The liquid crystal display panel is widely used due to its various advantages including low power consumption, miniaturization, lightness, and thinness. For example, the liquid crystal display panels are used in mobile phones, notebook computers, car display apparatus, televisions, etc.

SUMMARY

In one aspect, the present invention provides a display panel having a display area and a peripheral area, comprising a first display substrate; a second display substrate facing the first display substrate; a sealant layer in the peripheral area and between the first display substrate and the second display substrate, configured to seal the first display substrate and the second display substrate together to form a cell; and an elastic support layer in the peripheral area and between the first display substrate and the second display substrate, the elastic support layer encircled by the sealant layer and spaced apart from the sealant layer; wherein the elastic support layer substantially surrounds the display area; and the elastic support layer is configured to be in direct contact with the first display substrate and in direct contact with the second display substrate.

Optionally, the elastic support layer is a valve for liquid crystal molecules; the elastic support layer is fixedly attached to one of the first display substrate and the second display substrate, and is compressedly attached to another of the first display substrate and the second display substrate when the display panel is in a first state having a first cell gap between the first display substrate and the second display substrate, the elastic support layer is in a relatively more compressed state when the display panel is in the first state; and the elastic support layer is spaced apart from the another of the first display substrate and the second display substrate when the display panel is in a second state having a second cell gap between the first display substrate and the second display substrate, the elastic support layer is in a relatively more relaxed state when the display panel is in the second state, the second cell gap being greater than the first cell gap.

Optionally, the display panel further comprises a liquid crystal layer between the first display substrate and the second display substrate, and filling in the cell; wherein the elastic support layer completely surrounds the display area, forming a first space and a second space; the first spaced is formed between the sealant layer and the elastic support layer; the second space is formed to be encircled by the elastic support layer; and the first space is at least partially free of liquid crystal molecules when the display panel is in the first state.

Optionally, the first space is completely free of liquid crystal molecules display panel is in the first state.

Optionally, when the display panel is in the second state, the elastic support layer is spaced apart from the another of the first display substrate and the second display substrate, allowing fluid communication between the first space and the second space; and the first space is at least partially filled with liquid crystal molecules when the display panel is in the second state.

Optionally, the display panel is in the second state such that gravity pulls the liquid crystal molecules downward thereby spacing apart the elastic support layer from the another of the first display substrate and the second display substrate, allowing the liquid crystal molecules to flow into a space between the elastic support layer and the sealant layer.

Optionally, the elastic support layer comprises a plurality of elastic supports substantially surrounding the display area.

Optionally, the plurality of elastic supports comprise a first elastic support by a first side of the display area; and the first elastic support extends throughout the first side of the display area, and is longer than the first side.

Optionally, at least one of the first display substrate and the second display substrate comprises a pillow layer for enhancing a thickness of the at least one of the first display substrate and the second display substrate; and an orthographic projection of the pillow layer on the first display substrate at least partially overlaps with an orthographic projection of the elastic support layer on the first display substrate.

Optionally, the elastic support layer is configured to be in direct contact with the pillow layer to be in a compressed state.

Optionally, the pillow layer is in a same layer as a patterned layer in the at least one of the first display substrate and the second display substrate and comprises a same material as the patterned layer.

Optionally, the patterned layer is selected from a group consisting of a color filter layer, a black matrix layer, a gate line, and a data line.

Optionally, a portion of an integral layer in the peripheral area constitutes the pillow layer; the integral layer is a layer continuously extending from the display area into the peripheral area; the integral layer has a first thickness in the portion constituting the pillow layer and a second thickness in the display area; and the first thickness is greater than the second thickness.

Optionally, the integral layer is selected from a group consisting of a planarization layer, a passivation layer, a gate insulating layer, an inter-layer dielectric layer, and a buffer layer.

Optionally, the display panel further comprises a spacer layer in the display area and configured to space apart the first display substrate and the second display substrate;

wherein, when the elastic support layer is in direct contact with the first display substrate and in direct contact with the second display substrate, the elastic support layer has a degree of compression greater than that of the spacer layer.

Optionally, the elastic support layer and the spacer layer are in a same layer and comprise a same material.

In another aspect, the present invention provides a display apparatus, comprising the display panel described herein or fabricated by a method described herein.

In another aspect, the present invention provides a method of fabricating a display panel having a display area and a peripheral area, comprising providing a first display substrate and a second display substrate; forming a sealant layer in the peripheral area and between the first display substrate and the second display substrate, sealing the first display substrate and the second display substrate together to form a cell; and forming an elastic support layer in the peripheral area and between the first display substrate and the second display substrate, the elastic support layer formed to be encircled by the sealant layer and spaced apart from the sealant layer; wherein the elastic support layer is formed to substantially surround the display area; and the elastic support layer is formed to be in direct contact with the first display substrate and in direct contact with the second display substrate.

In another aspect, the present invention provides an operating method of operating a display panel having a display area and a peripheral area, wherein the display panel comprises a first display substrate; a second display substrate facing the first display substrate; a sealant layer in the peripheral area and between the first display substrate and the second display substrate, configured to seal the first display substrate and the second display substrate together to form a cell; an elastic support layer in the peripheral area and between the first display substrate and the second display substrate, the elastic support layer encircled by the sealant layer and spaced apart from the sealant layer; and a liquid crystal layer between the first display substrate and the second display substrate, and filling in the cell; wherein the elastic support layer substantially surrounds the display area; and the elastic support layer is configured to be in direct contact with the first display substrate and in direct contact with the second display substrate; wherein the operating method comprises using the elastic support layer as a valve for controlling a fluid communication of liquid crystal molecules between a first space between the sealant layer and the elastic support layer and a second space encircled by the elastic support layer.

Optionally, the operating method further comprises controlling the elastic support layer in a closed valve state, in which the elastic support layer is fixedly attached to one of the first display substrate and the second display substrate, and is compressedly attached to another of the first display substrate and the second display substrate when the display panel is in a first state having a first cell gap between the first display substrate and the second display substrate, the elastic support layer is in a relatively more compressed state when the display panel is in the first state; and controlling the elastic support layer in an open valve state, in which the elastic support layer is spaced apart from the another of the first display substrate and the second display substrate when the display panel is in a second state having a second cell gap between the first display substrate and the second display substrate, the elastic support layer is in a relatively more relaxed state when the display panel is in the second state, the second cell gap being greater than the first cell gap.

BRIEF DESCRIPTION OF THE FIGURES

The following drawings are merely examples for illustrative purposes according to various disclosed embodiments and are not intended to limit the scope of the present invention.

DETAILED DESCRIPTION

Figure 1:
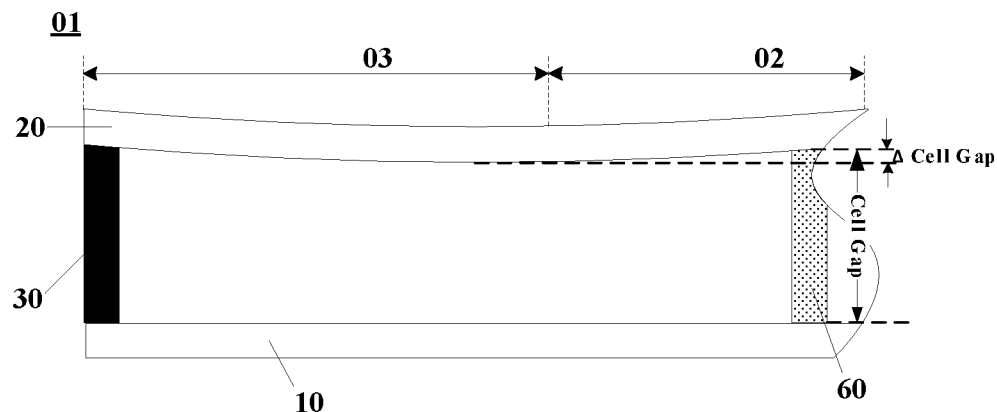
FIG. 1 is a partial cross-sectional view of a display panel in some embodiments according to the present disclosure.

The disclosure will now be described more specifically with reference to the following embodiments. It is to be noted that the following descriptions of some embodiments are presented herein for purpose of illustration and description only. It is not intended to be exhaustive or to be limited to the precise form disclosed.

In present, frameless and large-sized display panels are popular. However, a deformation is easily formed on a display panel when a force is applied on the surface of a frameless and large-sized display panel, leading to nonuniformity of cell gaps of the display panel and light leakage of the display panel. Light leakage may lower the display quality of the display panel. Light leakage can be solved by adjusting the liquid crystal retardation, which, however, may lead to loss of transmittance or loss of response time of the display panel.

Accordingly, the present disclosure provides, inter alia, a display panel, a display apparatus, a method of fabricating a display panel, and an operating method of operating a display panel that substantially obviate one or more of the problems due to limitations and disadvantages of the related art. In one aspect, the present disclosure provides a display panel having a display area and a peripheral area. Optionally, the display panel includes a first display substrate; a second display substrate facing the first display substrate; a sealant layer in the peripheral area and between the first display substrate and the second display substrate, configured to seal the first display substrate and the second display substrate together to form a cell; an elastic support layer in the peripheral area and between the first display substrate and the second display substrate, the elastic support layer encircled by the sealant layer and spaced apart from the sealant layer. Optionally, the elastic support layer substantially surrounds the display area. Optionally, the elastic support layer is configured to be in direct contact with the first display substrate and in direct contact with the second display substrate.

As used herein, the term "display area" refers to an area of a display substrate (e.g., a first display substrate or a second display substrate) in a display panel where image is actually displayed. Optionally, the display area may include both a subpixel region and an inter-subpixel region. A subpixel region refers to a light emission region of a subpixel, such as a region corresponding to a pixel electrode in a liquid crystal display or a region corresponding to a light emissive layer in an organic light emitting diode display panel. An inter-subpixel region refers to a region between adjacent subpixel regions, such as a region corresponding to a black matrix in a liquid crystal display or a region corresponding a pixel definition layer in an organic light emitting diode display panel. Optionally, the inter-subpixel region is a region between adjacent subpixel regions in a same pixel. Optionally, the inter-subpixel region is a region between two adjacent subpixel regions from two adjacent pixels.

As used herein the term "peripheral area" refers to an area of a display substrate (e.g., a first display substrate or a second display substrate) in a display panel where various circuits and wires are provided to transmit signals to the display substrate. To increase the transparency of the display apparatus, non-transparent or opaque components of the display apparatus (e.g., battery, printed circuit board, metal frame), can be disposed in the peripheral area rather than in the display areas.

As used herein, the term "elastic support layer" in the context of the present disclosure refers to a layer made of an elastic material. Optionally, the elastic material for making the elastic support layer has a Young's modulus in a range of approximately 0.001 GPa to approximately 10 GPa, e.g., approximately 0.001 GPa to approximately 0.5 GPa, approximately 0.5 GPa to approximately 1.0 GPa, approximately 1.0 GPa to approximately 1.5 GPa, and approximately 1.5 GPa to approximately 2.0 GPa. Optionally, the elastic material for making the elastic support layer has a Young's modulus in a range of approximately 0.001 GPa to approximately 1.5 GPa, e.g., approximately 0.001 GPa to approximately 0.1 GPa, approximately 0.1 GPa to approximately 0.2 GPa, approximately 0.2 GPa to approximately 0.3 GPa, approximately 0.3 GPa to approximately 0.4 GPa, and approximately 0.4 GPa to approximately 0.5 GPa, approximately 0.5 GPa to approximately 1.0 GPa and approximately 1.0 GPa to approximately 1.5 GPa.

As used herein the term "substantially surrounding" refers to surrounding at least 50% (e.g., at least 60%, at least 70%, at least 80%, at least 90%, at least 95%, at least 99%, and 100%) of a perimeter of an area. For example, the elastic support layer surrounds at least 50% of a perimeter of the display area.

As used herein, the term "encircle" refers to "to pass completely around." The term "encircle" is not limited to mean literally forming a circle, although it may include forming a circle, but may also include entirely or partially forming a perimeter around, entirely or partially surrounding, and/or being located at near an entire or partial periphery of that which is being encircled.

FIG. 1 is a partial cross-sectional view of a display panel in some embodiments according to the present disclosure. Referring to FIG. 1, in some embodiments, a display panel 01 has a display area 02 and a peripheral area 03. Optionally, the display panel 01 includes a first display substrate 10, a second display substrate 20 facing the first display substrate, and a sealant layer 30 in the peripheral area 03 and between the first display substrate 10 and a second display substrate 20. Optionally, the sealant layer 30 is configured to seal the first display substrate 10 and the second display substrate 20 together to form a cell.

In some embodiments, the display panel 01 includes a spacer layer 60 in the display area 02 to space apart the first display substrate 10 and the second display substrate 20. In one example, the spacer layer 60 is to maintain a cell gap between the first display substrate 10 and the second display substrate 20.

In some embodiments, no space layer is disposed in the peripheral area 03. When a force is applied on the second display substrate 20, a deformation is formed on the second display substrate 20, leading to a change of the cell gap Δ Cell Gap. Because of the change of the cell gap Δ Cell Gap, light leakage will occur on the display panel 01. Especially when the display panel 01 is a frameless and large-sized display panel, the light leakage is more obvious.

Figure 2:
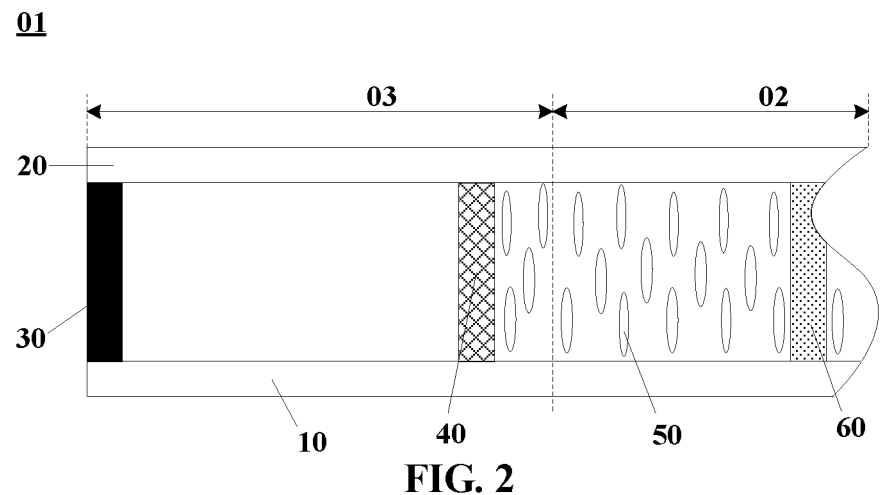
FIG. 2 is a partial cross-sectional view of a display panel in some embodiments according to the present disclosure.

FIG. 2 is a partial cross-sectional view of a display panel in some embodiments according to the present disclosure. Referring to FIG. 2, in some embodiments, a display panel 01 has a display area 02 and a peripheral area 03. Optionally, the display panel 01 includes a first display substrate 10, a second display substrate 20 facing the first display substrate, a sealant layer in the peripheral area 03, and between the first display substrate 10 and a second display substrate 20, and an elastic support layer 40 in the peripheral area 03 and between the first display substrate 10 and the second display substrate 20. Optionally, the sealant layer 30 is configured to seal the first display substrate 10 and the second display substrate 20 together to form a cell. Optionally, the elastic support layer 40 is encircled by the sealant layer 30 and spaced apart from the sealant layer 30. Optionally, the elastic support layer 40 is configured to be in direct contact with the first display substrate 10 and in direct contact with the second display substrate 20.

In some embodiments, the second display substrate 20 is a color filter substrate, for example, the second display substrate 20 optionally includes a color filter layer, and a black matrix layer.

In some embodiments, the first display substrate 10 includes thin film transistors, data lines, and gate lines. Optionally, a respective one of the thin film transistors includes a source electrode, a drain electrode, an active layer, a gate electrode, a gate insulating layer, etc.

In some embodiments, referring to FIG. 2, the display panel 01 includes a liquid crystal layer 50 between the first display substrate 10 and the second display substrate 20, and filling in the cell formed by assembling the first display substrate 10 and the second display substrate 20.

In some embodiments, the elastic support layer 40 can be formed on the first display substrate 10. In one example, the elastic support layer 40 be formed in the same process of forming other layers on a side of the first display substrate 10 closer to the second display substrate 20. In another example, the elastic support layer 40 is formed in a process different from a process forming other layers on a side of the first display substrate 10 facing the second display substrate 20. For example, the first display substrate 10 includes a spacer layer 60 in the display area 02. The elastic support layer 40 and the spacer layer 60 are formed in a same process. Alternatively, the elastic support layer 40 and the spacer layer 60 are formed in different processes.

In some embodiments, the elastic support layer 40 can be formed on the second display substrate 20. In one example, the elastic support layer 40 be formed in the same process of forming other layers on a side of the second display substrate 20 closer to the first display substrate 10. In another example, the elastic support layer 40 is formed in a process different from a process forming other layers on a side of the second display substrate 20 facing the first display substrate 10. For example, the second display substrate 20 includes a spacer layer 60 in the display area 02. The elastic support layer 40 and the spacer layer 60 are formed in a same process. Alternatively, the elastic support layer 40 and the spacer layer 60 are formed in different processes.

In some embodiments, the elastic support layer 40 is on a side of the sealant layer 30 closer to the display area 02.

In some embodiments, referring to FIG. 2, the elastic support layer 40 is formed in the peripheral area 03. Optionally, the elastic support layer 40 is formed between an edge of the display panel 01 and an interface between the peripheral area 03 and the display area 02.

Figure 3A:
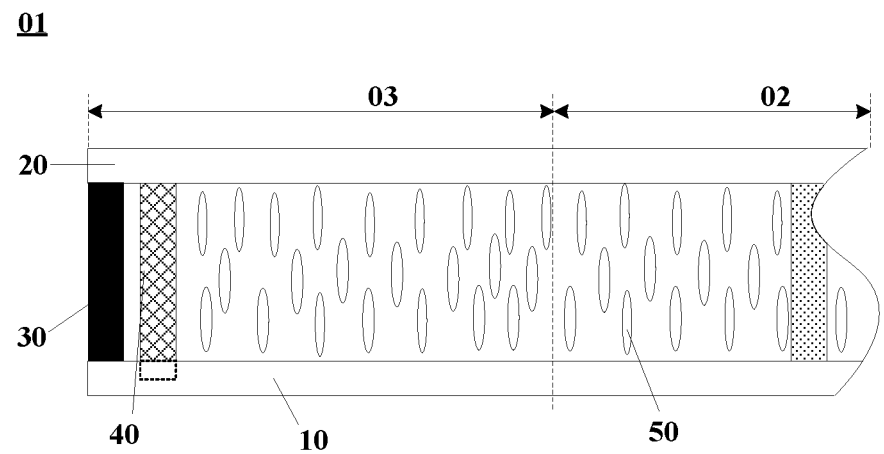
FIG. 3A is a partial cross-sectional view of a display panel in some embodiments according to the present disclosure.
Figure 3B:
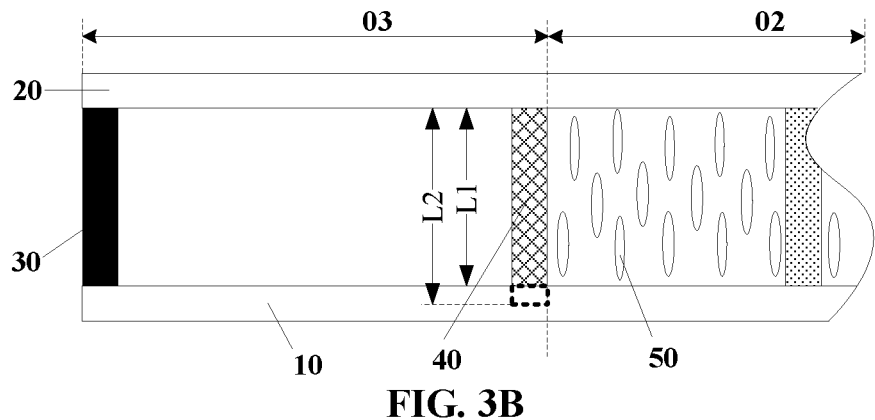
FIG. 3B is a partial cross-sectional view of a display panel in some embodiments according to the present disclosure.
Figure 3C:
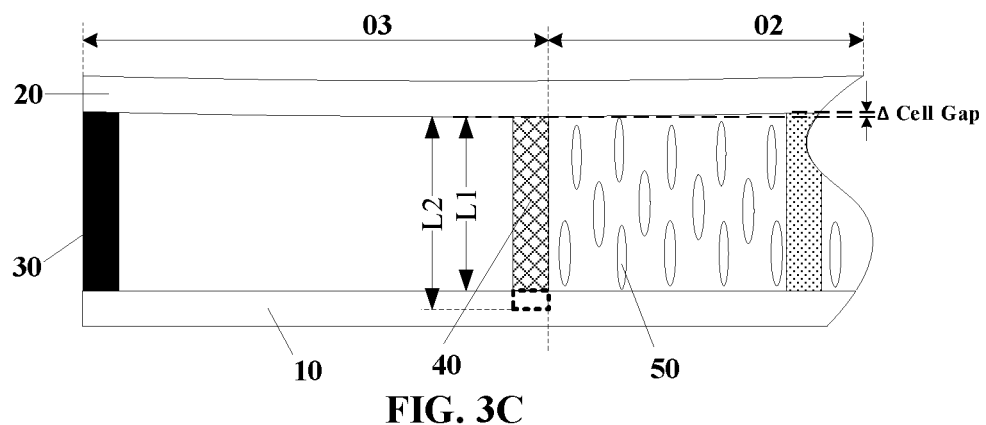
FIG. 3C is a partial cross-sectional view of a display panel in some embodiments according to the present disclosure.

FIGS. 3A-3C are partial cross-sectional views of a display panel in some embodiments according to the present disclosure. Referring to FIG. 3A, optionally, the elastic support layer 40 is formed closer to an edge of the display panel 01 in the peripheral area 03. A distance between the elastic support layer 40 and the edge of the display panel 01 is less than a distance between the elastic support layer 40 and the interface between the peripheral area 03 and the display area 02. For example, the elastic support layer 40 is formed closer to the sealant layer 30 of the display panel 01 in the peripheral area 03. Referring to both FIG. 3B and FIG. 3C, optionally, the elastic support layer 40 is formed closer to an interface between the peripheral area 03 and the display area 02. A distance between the elastic support layer 40 and the edge of the display panel 01 is greater than a distance between the elastic support layer 40 and the interface between the peripheral area 03 and the display area 02.

In some embodiments, in a plan view of the display panel, the elastic support layer 40 is formed on a side of the display panel 01. Optionally, the elastic support layer 40 is formed on two sides of the display panel 01. Optionally, the elastic support layer 40 is formed on three sides of the display panel 01.

FIGS. 4A-4D are plan views of a display panel in some embodiments according to the present disclosure. Referring to FIGS. 4A-4D, the elastic support layer 40 is formed on four sides of the display panel 01. In one example, the elastic support layer 40 on four sides of the display panel 01 may increase the support for the second display substrate 20 and the first display substrate 10. In another example, when a force is applied on the second display substrate 20 or on the first display substrate 10, the elastic support layer 40 on either side of the four side of the display panel 01 can support the first display substrate 10 and the second display substrate 20 to avoid forming a change of cell gap Δ Cell Gap.

Various shapes may be used for making the elastic support layer 40. Shapes suitable for the elastic support layer 40 may be determined according to the arrangement of circuits in the peripheral area 03. Optionally, an orthographic projection of the elastic support layer 40 on the first display substrate 10 does not overlap with an orthographic projection of the circuits, in the peripheral area 03, on the first display substrate 10.

In some embodiments, the elastic support layer 40 includes a plurality of elastic supports 400 surrounding the display area 02. Various shapes may be adopted by the plurality of elastic supports 400. Example of shapes suitable for making the plurality of elastic supports 400 include, but are not limited to, a strip shape, a circular shape, a rectangular shape, and a square shape. Optionally, referring to FIG. 4A and FIG. 4B, a respective one of the plurality of elastic supports 400 has a strip shape. Optionally, referring to FIG. 4C, one of the plurality of elastic supports 400 has a dotted shape. Optionally, one of the plurality of elastic supports 400 has a square shape. Optionally, one of the plurality of elastic supports 400 has a rectangular shape.

In some embodiments, a respective one of the plurality of elastic supports 400 has a same shape as the remaining ones of the plurality of elastic supports 400. Optionally, referring to FIG. 4D, at least one of the plurality of elastic supports 400 has a shape different from shapes of the remaining elastic supports of the plurality of elastic supports 400. For example, one of the plurality of elastic supports 400 has a strip shape. One of the plurality of elastic supports 400 has a rectangular shape.

In some embodiments, spaces between two adjacent elastic supports of the plurality of elastic supports 400 are the same. Optionally, spaces between two adjacent elastic supports of the plurality of elastic supports 400 are different.

Referring to FIG. 3B, no force is applied to the display panel 01. Referring to FIG. 3C, when a force is applied to the display panel 01, the elastic support layer 40 can support the first display substrate 10 and the second display substrate 20 to keep the cell formed between the first display substrate 10 and the second display substrate 20 substantially the same as no force is applied to the display panel 01 as shown in FIG. 3B.

Comparing FIG. 3C with FIG. 1, due to the support of the elastic support layer 40, when a force is applied to the display panel 01, a change of cell gap Δ Cell Gap in FIG. 3C is smaller than a change of cell gap Δ Cell Gap in FIG. 1.

In some embodiments, the elastic support layer 40 is configured to be in direct contact with the first display substrate 10 and in direct contact with the second display substrate 20. When a force is applied on the first display substrate 10 or on the second display substrate 20, the elastic support layer 40 in the peripheral area 03 supports the first display substrate 10 and the second display substrate 20 to avoid the deformation on the display panel 01, and to further avoid the nonuniformity of the thickness of the liquid crystal layer 50 due to the deformation of cell between the first display substrate 10 and the second display substrate 20. The support of the elastic support layer 40 may reduce the light leakage of the display panel 01, and improve the display quality of the display panel 01. Using the elastic support layer 40 to solve the problem of light leakage will not have adversary effect on the optical characteristics, electrical characteristic, or other characteristics of the elastic support layer 40.

Various appropriate materials may be used for making the elastic support layer 40. Examples of materials suitable for making the elastic support layer 40 include, but are not limited to, hard materials, and elastic materials. In general, the first display substrate 10 and the second display substrate 20 are made of glass. If the elastic support layer 40 is made of hard materials, it is easy for the elastic support layer 40 to break the first display substrate 10 or the second display substrate 20 made of glass. In one example, the elastic support layer 40 is made of elastic materials which can be deformed when a force is applied on it and can restore to its original shape when the force is removed.

In some embodiments, referring to FIG. 3B, in an initial state, the elastic support layer 40 is fixedly attached to one of the first display substrate 10 and the second display substrate 20, and is compressedly attached to another of the first display substrate 10 and the second display substrate 20. For example, an amount of compression of the elastic support layer 40 is greater than zero. The initial state refers to a state at which the thickness of each portion of the display panel 01 is uniform. For example, in the initial state, no force or heat is applied to the display panel 01. As used herein, the term "amount of compression" refers to a physical displacement of a structural element (e.g., the elastic support layer) along a direction from the first display substrate to the second display substrate (e.g., a length direction of the structural element) when the structural element is disposed between the first display substrate and the second display substrate as compared to the structural element in a resting, undisturbed state.

In the initial state, a second layer thickness L2 is a thickness of the elastic support layer 40 when no compression is applied to the elastic support layer 40. Optionally, a first layer thickness L1 of the elastic support layer 40 is smaller than a second layer thickness L2 of the elastic support layer 40 without any compression. For example, referring to FIG. 3B and FIG. 3C, the dotted line shows a state of the elastic support layer 40 without any compression.

Since the elastic support layer 40 is compressed, it can provide a stronger support to one of the first display substrate 10 and the second display substrate 20. When a force is applied to the display panel 01, the elastic support layer 40 can effective avoid the deformation of the cell, formed between the first display substrate 10 and the second display substrate 20, to keep the uniformity of the thickness of each portion of the cell.

Figure 6:
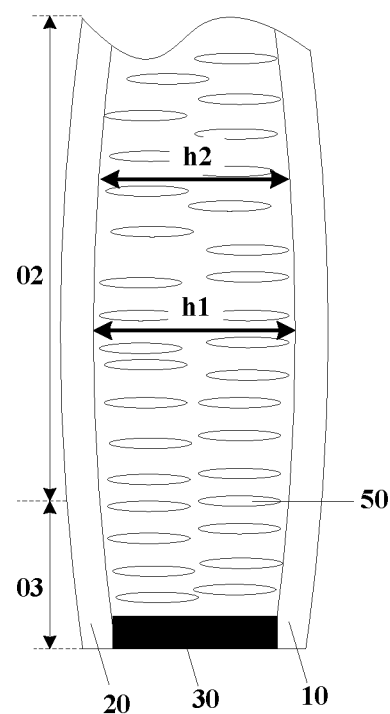
FIG. 6 is a partial cross-sectional view of a display panel in some embodiments according to the present disclosure.

FIG. 6 is a partial cross-sectional view of a display panel in some embodiments according to the present disclosure. Referring to FIG. 6, in some embodiments, a liquid crystal layer 50 is between the first display substrate 10 and the second display substrate 20, and is indirect contact with the sealant layer 30. In one example, under the influence of gravity, the liquid crystal molecules of the liquid crystal layer 50 accumulates on a side of the liquid crystal layer 50 closer to the sealant layer 30, a thickness h1 of a portion of the liquid crystal layer 50 where more liquid crystal molecules accumulates is greater than a thickness h2 of a portion of the liquid crystal layer 50 where less liquid molecules accumulates, which leads to Gravity Mura effect. In another example, when the display panel is heated, the liquid crystal layer 50 will expand, a thickness h1 of an extended portion of the liquid crystal layer 50 is greater than a thickness h2 of an unexpended portion of the liquid crystal layer 50, which leads to Mura effect.

Especially when a display panel has a large size, the Gravity Mura effect is more serious. For example, when a display panel has the Gravity Mura effect on an image display by the display panel, a part of the image closer to the bottom edge of the display panel turns yellow.

Figure 7A:
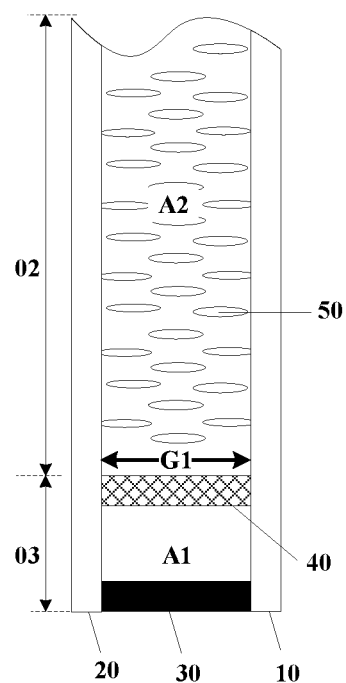
FIG. 7A is a partial cross-sectional view of a display panel in some embodiments according to the present disclosure.

FIG. 7A is a partial cross-sectional view of a display panel in some embodiments according to the present disclosure. FIG. 7A shows that the elastic support layer is at a first state. In some embodiments, referring to FIG. 7A, the elastic support layer 40 is a valve for liquid crystal molecules. Optionally, the elastic support layer 40 is fixedly attached to one of the first display substrate 10 and the second display substrate 20.

In some embodiments, the elastic support layer 40 is compressedly attached to another of the first display substrate 10 and the second display substrate 20 when the display panel 01 is in the first state having a first cell gap G1 between the first display substrate 10 and the second display substrate 20. The elastic support layer 40 is in a relatively more compressed state when the display panel 01 is in the first state. The first cell gap G1 refers to a thickness of a cell between the first display substrate 10 and the second display substrate 20. For example, the first cell gap G1 optionally is a thickness of the cell at a plane containing a surface of the elastic support layer 40 in direct contact with the liquid crystal layer 50, in the first state, the plane being substantially perpendicular to the first display substrate 10 and the second display substrate 20.

Figure 7B:
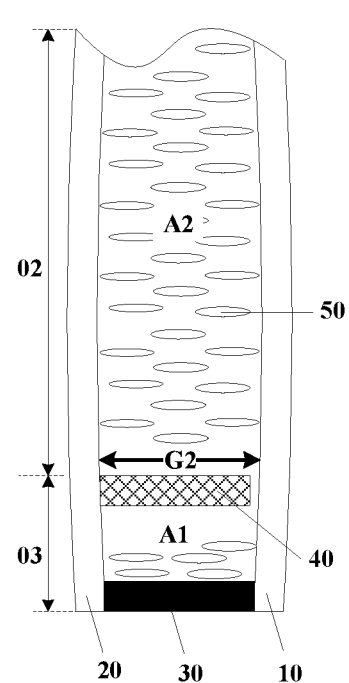
FIG. 7B is a partial cross-sectional view of a display panel in some embodiments according to the present disclosure.

FIG. 7B is a partial cross-sectional view of a display panel in some embodiments according to the present disclosure. FIG. 7B shows that the elastic support layer is at a second state. In some embodiments, referring to FIG. 7B, the elastic support layer 40 is spaced apart from the another of the first display substrate 10 and the second display substrate 20 when the display panel 01 is in the second state having a second cell gap G2 between the first display substrate 10 and the second display substrate 20. The elastic support layer 40 is in a relatively more relaxed state when the display panel 01 is in the second state. The second cell gap G2 is greater than the first cell gap G1. The second cell gap G2 refers to a thickness of a cell between the first display substrate 10 and the second display substrate 20. For example, the second cell gap G2 optionally is a thickness of the cell at a plane having a side of the elastic support layer 40 in direct contact with the liquid crystal layer 50, in the second state, the plane being substantially perpendicular to the first display substrate 10 and the second display substrate 20.

In one example, referring to FIG. 7B, the elastic support layer 40 is spaced apart from the first display substrate 10 when the display panel 01 is in the second state having the second cell gap G2 between the first display substrate 10 and the second display substrate 20. In another example, the elastic support layer is spaced apart from the second display substrate when the display panel is in the second state having the second cell gap between the first display substrate and the second display substrate.

Figure 5:
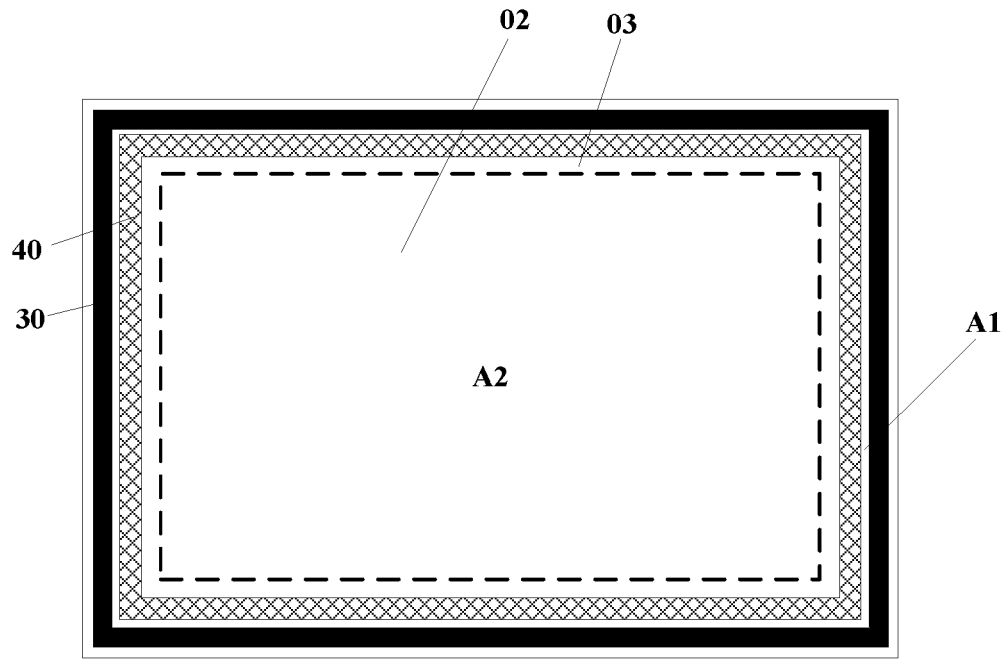
FIG. 5 is a plan view of a display panel in some embodiments according to the present disclosure.

FIG. 5 is a plan view of a display panel in some embodiments according to the present disclosure. Referring to FIG. 5, in some embodiments, the elastic support layer 40 completely surrounds (e.g., 100% surrounds) the display area 03 to form a first space A1 between the sealant layer 30 and the elastic support layer 40, and a second space A2 encircled by the elastic support layer 40. Referring to FIG. 7A, the first space A1 has a subspace which can accommodate liquid crystal molecules from the second space A2 in the first state. Optionally, the first space A1 is at least partially free of liquid crystal molecules when the display panel 01 is in the first state. Optionally, the first space A1 is completely free of liquid crystal molecules when the display panel 01 is in the first state. Optionally, the second space A2 has liquid crystal molecules. As used herein, the term "partially free" refers to that more than 0% but less than 100% of a space include a particular molecule (e.g., the liquid crystal molecule). As used herein, the term "completely free" refers to that a space does not include a particular molecule (e.g., the liquid crystal molecule). For example, the space includes 0 such molecule. As used herein, the term "at least partially free" refers to that less than 100% (e.g., can be 0%) of a space include a particular molecule (e.g., the liquid crystal molecule).

In some embodiments, referring to FIG. 5, the elastic support layer 40 completely surrounds the display area 03. Optionally, the elastic support layer 40 continuously surrounds the display area 02. Optionally, the elastic support layer 40 is a closed circle completely surrounding the display area 02.

In some embodiments, referring to FIG. 7B, when the display panel 01 is in the second state, the elastic support layer 40 is spaced apart from the another of the first display substrate 10 and the second display substrate 20, allowing fluid communication between the first space A1 and the second space A2. Optionally, the first space A1 is at least partially filled with liquid crystal molecules when the display panel 01 is in the second state. As used herein, the term "partially filled" refers to that more than 0% but less than 100% filled. As used herein, the term "at least partially filled" refers to that more than 0% (e.g., can be 100%) filled.

In one example, referring to FIG. 7B, when the display panel 01 is in the second state, the elastic support layer 40 is spaced apart from the first display substrate 10, allowing fluid communication between the first space A1 and the second space A2. In another example, when the display panel is in the second state, the elastic support layer is spaced apart from the second display substrate, allowing fluid communication between the first space and the second space.

Referring to FIGS. 4A to 4D, in some embodiments, the elastic support layer 40 substantially surrounds the display area 03. Optionally, the elastic support layer 40 partially surrounds (e.g., less than 100% surrounds) the display area 03.

Figure 4A:
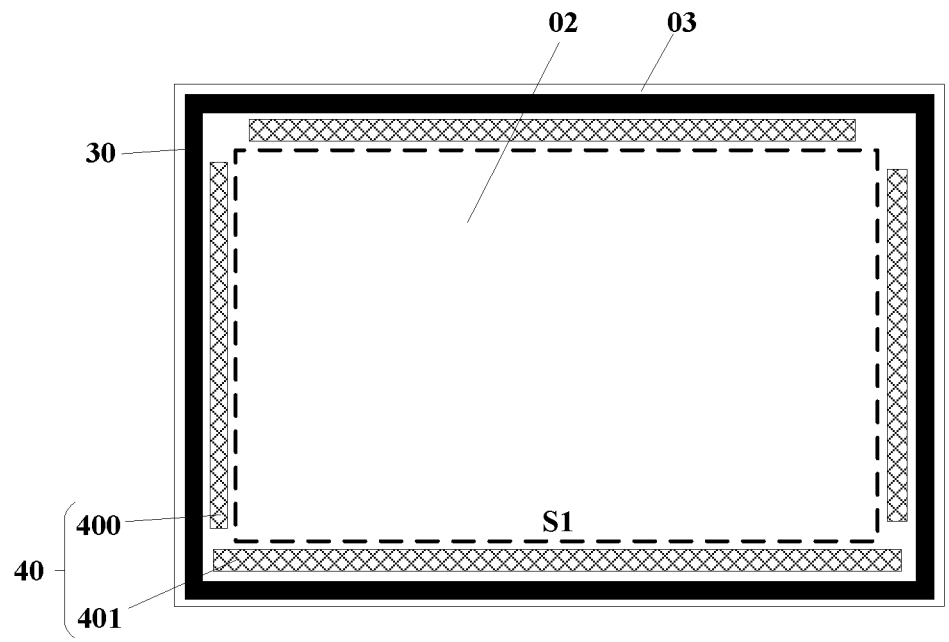
FIG. 4A is a plan view of a display panel in some embodiments according to the present disclosure.
Figure 4B:
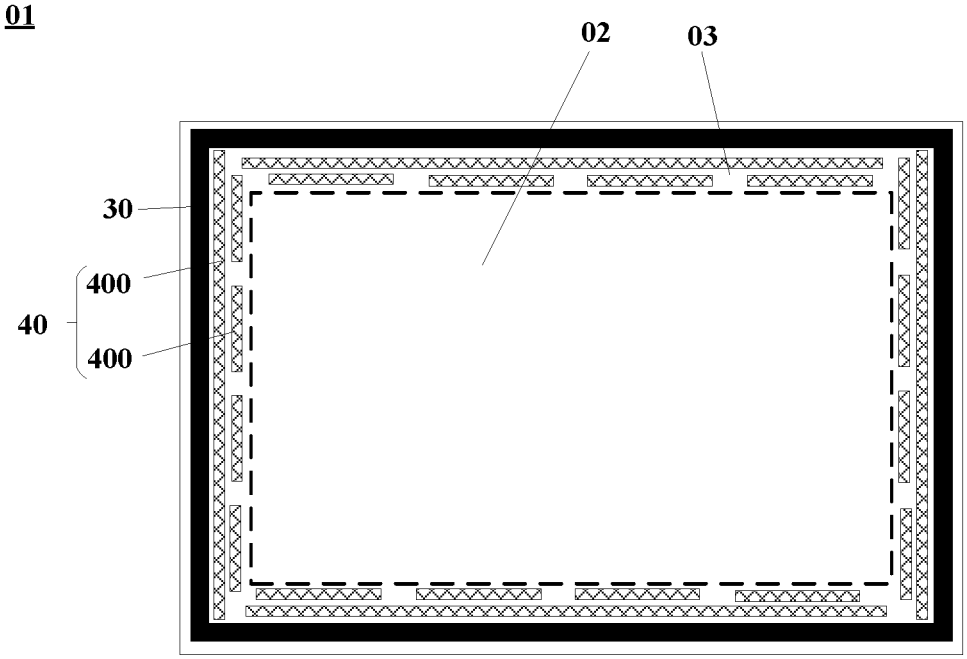
FIG. 4B is a plan view of a display panel in some embodiments according to the present disclosure.
Figure 4C:
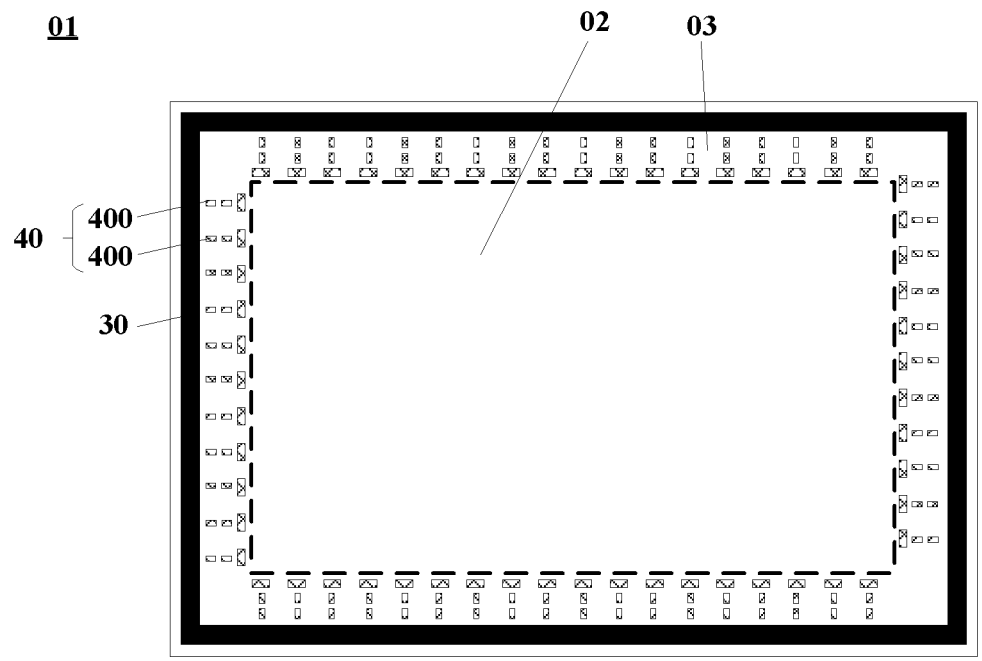
FIG. 4C is a plan view of a display panel in some embodiments according to the present disclosure.
Figure 4D:
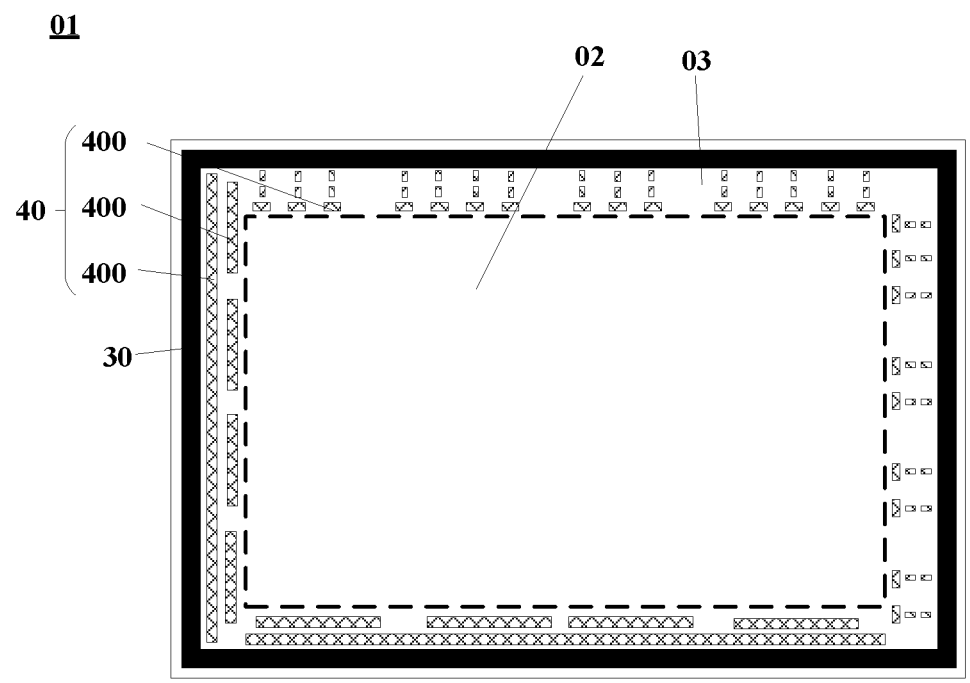
FIG. 4D is a plan view of a display panel in some embodiments according to the present disclosure.

In some embodiments, referring to FIG. 4A, the elastic support layer 40 includes a plurality of elastic supports 400 substantially surrounding the display area 02. The plurality of elastic supports include a first elastic support 401 by a first side of the display area 02. Optionally, the first elastic support 401 extends throughout the first side S1 of the display area 02, and is longer than the first side S1.

In some embodiments, the display panel 01 is in the second state such that gravity pulls the liquid crystal molecules downward thereby spacing apart the elastic support layer 40 from the another of the first display substrate 10 and the second display substrate 20, allowing the liquid crystal molecules to flow into a space between the elastic support layer 40 and the sealant layer 30.

Figure 7C:
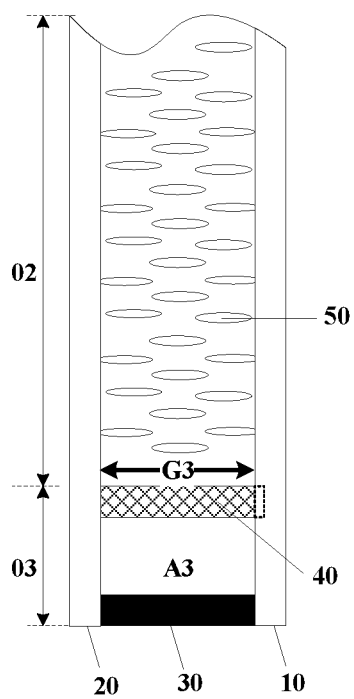
FIG. 7C is a partial cross-sectional view of a display panel in some embodiments according to the present disclosure.
Figure 7D:
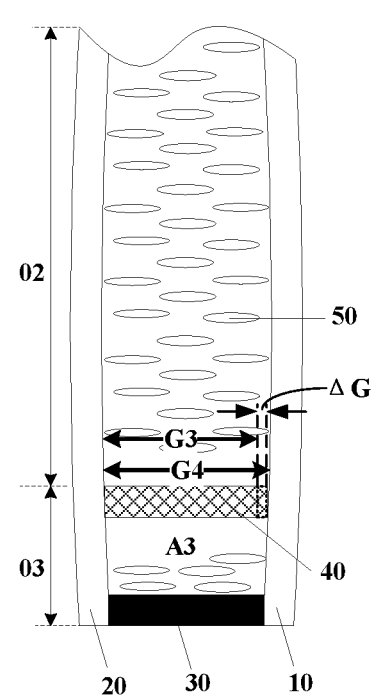
FIG. 7D is a partial cross-sectional view of a display panel in some embodiments according to the present disclosure.

FIGS. 7C and 7D are partial cross-sectional views of a display panel in some embodiments according to the present disclosure. In one example, referring to FIG. 7D, the display panel 01 is in the second state such that gravity pulls the liquid crystal molecules downward thereby spacing apart the elastic support layer 40 from the first display substrate 10, allowing the liquid crystal molecules to flow into a space A3 between the elastic support layer 40 and the sealant layer 30. In another example, the display panel is in the second state such that gravity pulls the liquid crystal molecules downward thereby spacing apart the elastic support layer from the second display substrate, allowing the liquid crystal molecules to flow into a space between the elastic support layer and the sealant layer 30.

In some embodiments, in order to display image, the display panel 01 includes a liquid crystal layer 50 between the first display substrate 10 and the second display substrate 20 in the display area 02. For example, the display panel 01 has liquid crystal molecules between the first display substrate 10 and the second display substrate 20 in the display area 02.

In some embodiments, the space A3 between the elastic support layer 40 and the sealant layer 30 has a subspace to accommodate liquid crystal molecules. Optionally, the space A3 between the elastic support layer 40 and the sealant layer 30 is at least partially free of liquid crystal molecules when the elastic support layer 40 is in direct contact with both the first display substrate 10 and the second display substrate 20. Optionally, the space A3 between the elastic support layer 40 and the sealant layer 30 is completely free of liquid crystal molecules when the elastic support layer 40 is in direct contact with both the first display substrate 10 and the second display substrate 20.

In some embodiments, under the influence of gravity or heat, the thickness of a portion of the liquid crystal layer 50 may increase. Optionally, the increasing thickness of the portion of the liquid crystal layer 50 may push the first display substrate 10 and the second display substrate 20 to make the elastic support layer 40 spaced apart from one of the first display substrate 10 and the second display substrate 20. In one example, the elastic support layer 40 is fixedly to the first display substrate 10, as the thickness of the portion of the liquid crystal layer 50 increases, the elastic support layer 40 is spaced apart from the second display substrate 20. In another example, the elastic support layer 40 is fixedly to the second display substrate 20, as the thickness of the portion of the liquid crystal layer 50 increases, the elastic support layer 40 is spaced apart from the first display substrate 10.

In some embodiments, the elastic support layer 40 is a valve for liquid crystal molecules. Optionally, the space A3 between the elastic support layer 40 and the sealant layer 30 has a subspace to accommodate liquid crystal molecules. In one example, the space between the elastic support layer 40 and the sealant layer 30 is at least partially free of liquid crystal molecules when the elastic support layer 40 is in direct contact with both the first display substrate 10 and the second display substrate 20. In another example, the space A3 between the elastic support layer 40 and the sealant layer 30 is completely free of liquid crystal molecules when the elastic support layer 40 is in direct contact with both the first display substrate 10 and the second display substrate 20. Optionally, the display area 02 and the peripheral area 03 have fluid communication between each other when the elastic support layer 40 is spaced apart from one of the first display substrate 10 and the second display substrate 20. In one example, when the elastic support layer 40 is spaced apart from the first display substrate 10, the liquid crystal molecules moves from the display area 02 to the peripheral area 03. In another example, when the elastic support layer 40 is spaced apart from the second display substrate 20, the liquid crystal molecules moves from the display area 02 to the peripheral area 03. The liquid communication between the display area 02 and the peripheral area 03 reduce the thickness of the liquid crystal layer 50, and further reduce the change of the cell gap Δ Cell Gap, which may reduce the chance of having Gravity Mura effect.

In some embodiments, the display panel 01 is attached to a back light using adhesive materials including tapes. In one example, the first display substrate 10 is attached to the back light. In another example, the second display substrate 20 is attached to the back light. Optionally, an adhesive stress between the back light and the first display substrate 10 or an adhesive stress between the back light and the second display substrate 20 may cause light leakage on the display panel 01.

In some embodiments, when the first display substrate 10 is attached to the back light, forces (e.g. adhesive stress) applied to different regions of the first display substrate 10 are different, which may cause deformation on the display panel 01 and leads to light leakage on the display panel 01. In some embodiments, when the second display substrate 20 is attached to the back light, forces (e.g. adhesive stress) applied to different regions of the second display substrate 20 are different, which may cause deformation on the display panel 01 and leads to light leakage on the display panel 01.

Optionally, the space A3 between the elastic support layer 40 and the sealant layer 30 has a subspace to accommodate liquid crystal molecules. In one example, the space A3 between the elastic support layer 40 and the sealant layer 30 is at least partially free of liquid crystal molecules when the elastic support layer 40 is in direct contact with both the first display substrate 10 and the second display substrate 20. In another example, the space A3 between the elastic support layer 40 and the sealant layer 30 is completely free of liquid crystal molecules when the elastic support layer 40 is in direct contact with both the first display substrate 10 and the second display substrate 20. When the elastic support layer 40 is spaced apart from one of the first display substrate 10 or the second display substrate 20, liquid crystal molecules moves from the display area 02 to the peripheral area 03, the amount of liquid crystal molecules in the display area 02 is reduced. The phrase difference in peripheral area 03 caused by different thicknesses of different regions of liquid crystal layer 50 can be reduced, reducing the light leakage due to the adhesive stress.

Figure 8:
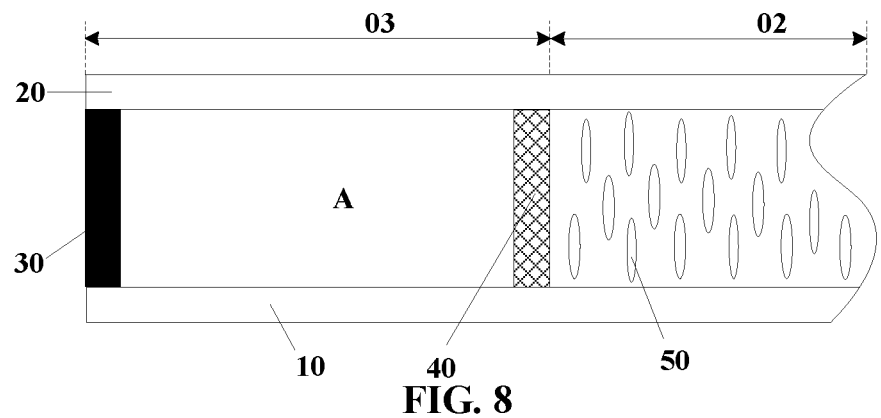
FIG. 8 is a partial cross-sectional view of a display panel in some embodiments according to the present disclosure.

FIG. 8 is a partial cross-sectional view of a display panel in some embodiments according to the present disclosure. Referring to FIG. 8, in some embodiments, the elastic support layer 40 completely surrounds the display area 02 as shown in FIG. 5, the display panel 01 further include a liquid crystal layer 50 in the display area 02, and between the first display substrate 10 and the second display substrate 20. Optionally, the liquid crystal layer 50 is in direct contact with a side of the elastic support layer 40 away from the sealant layer 30.

In some embodiments, referring to FIG. 7C and FIG. 7D, in the peripheral area 03, a space A3 between the elastic support layer 40 and the sealant layer 30 has a subspace to accommodate liquid crystal molecules. Optionally, the space A3 between the elastic support layer 40 and the sealant layer 30 is at least partially free of liquid crystal molecules when the elastic support layer 40 is in direct contact with both the first display substrate 10 and the second display substrate 20. Optionally, the space A3 between the elastic support layer 40 and the sealant layer 30 is completely free of liquid crystal molecules when the elastic support layer 40 is in direct contact with both the first display substrate 10 and the second display substrate 20. The amount of liquid crystal molecules in the peripheral area 03 is greatly reduced, which may reduce the light leakage on the display panel 01 due to the deformation of the display panel 01 caused by forces.

In some embodiments, before human eye can recognize the Gravity Mura effect on the display panel 01, a portion of the elastic support layer 402 should be spaced apart from one of the first display substrate 10 and the second display substrate 20 to allow fluid communication between the display area 02 and the peripheral area 03. Optionally, the amount of compression of the elastic support layer 40 in the initial state should be designed based on a critical change of cell gap. When the critical change of call gap is formed in a display panel, human eye can recognize the Gravity Mura effect.

Referring to FIG. 7C, in some embodiment, in an initial state (e.g. a first state), the amount of compression of the elastic support layer 40 is an initial compression. The dotted line shows a state of the elastic support layer 40 without any compression. A cell gap between the first display substrate 10 and the second display substrate 20 in a plane having a side of the elastic support layer 40 is a third cell gap G3.

Referring to FIG. 7D, in some embodiments, in a second state, a cell gap between the first display substrate 10 and the second display substrate 20 in a plane having a side of the elastic support layer 40 increases to a fourth cell gap G4. Optionally, a change of cell gap Δ Cell Gap from the third cell gap G3 to the fourth cell gap G4 equals to the critical change of cell gap ΔG=G4−G3, wherein G3 is the cell gap between the first display substrate 10 and the second display substrate 20 in a plane having a side of the elastic support layer 40 in the initial state (e.g. the first state), G4 is the cell gap between the first display substrate 10 and the second display substrate 20 in a plane having a side of the elastic support layer 40 when the display panel 01 is heated or under the influence of gravity (e.g. the second state), wherein an initial state is a state at which the display panel 01 is not heated or under the influence of gravity, and the cell gaps of all region of the display panel 01 are uniform.

When the change of cell gap Δ Cell Gap is the critical change of cell gap ΔG, human eye can start to recognize the Gravity Mura effect. Optionally, the initial compression of the elastic support layer 40 should be equivalent to the critical change of cell gap ΔG, so that as the cell gap keeps increasing (e.g. becomes greater than G4), the amount of compression of the elastic support layer 40 is zero, and the elastic support layer 40 is spaced apart from one of the first display substrate 10 and the second display substrate 20, to allow fluid communication between the display area 02 and the peripheral area 03.

In some embodiments, G4=CV/(Ab), wherein C is in a range of 0.5% to 6%, e.g. 0.5% to 1%, 1% to 2%, 2% to 3%, 3% to 4%, 4% to 5%, and 5% to 6%. V is the volume of liquid crystal layer 50 in the display panel 01. A is a height of the liquid crystal layer 50 in a peripheral area 03 along a first direction from the peripheral area 03 to the display area 02. A is not greater than the width of the peripheral area 03 along the first direction from the peripheral area 03 to the display area 02. Optionally, A is in a range of 2 mm to 6 mm, e.g. 2 mm to 3 mm, 3 mm to 4 mm, 4 mm to 5 mm, and 5 mm to 6 mm. b is a length of a side of the display panel perpendicular to the first direction from the peripheral area 03 to the display area 02.

Figure 9:
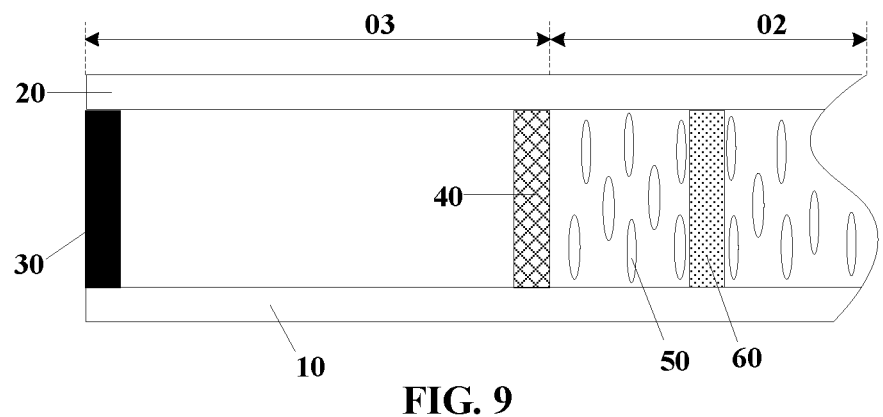
FIG. 9 is a partial cross-sectional view of a display panel in some embodiments according to the present disclosure.

FIG. 9 is a partial cross-sectional view of a display panel in some embodiments according to the present disclosure. Referring to FIG. 9, in some embodiments, the display panel 01 further includes a spacer layer 60 (e.g. a main spacer) in the display area 02 and configured to space apart the first display substrate 10 and the second display substrate 20.

In some embodiments, in order to ensure that the liquid crystal molecules in the display area 02 are closely arranged without bubbles, the spacer layer 60 in the display area 02, is compressed, e.g., has an amount of compression.

Optionally, when the elastic support layer 40 is in direct contact with the first display substrate 10 and in direct contact with the second display substrate 20, the elastic support layer 40 has a degree of compression smaller than that of the spacer layer 60.

Optionally, when the elastic support layer 40 is in direct contact with the first display substrate 10 and in direct contact with the second display substrate 20, the elastic support layer 40 has a degree of compression equivalent to that of the spacer layer 60.

Optionally, when the elastic support layer 40 is in direct contact with the first display substrate 10 and in direct contact with the second display substrate 20, the elastic support layer 40 has a degree of compression greater than that of the spacer layer 60. For example, the degree of compression of the elastic support layer 40 is greater than the degree of compression of the spacer layer 60 for at least 5% of the degree of compression of the elastic support layer 40, e.g. at least 10% of the degree of compression of the elastic support layer 40, at least 15% of the degree of compression of the elastic support layer 40, and at least 20% of the degree of compression of the elastic support layer 40.

As used herein, the term "degree of compression" refers to a physical displacement of a structural element (e.g., the elastic support layer) along a direction from the first display substrate to the second display substrate (e.g., a length direction of the structural element) when the structural element is disposed between the first display substrate and the second display substrate, as a percentage of the structural element in a resting, undisturbed state.

For example, the elastic support layer 40 has a degree of compression equivalent to or great than that of the spacer layer 60, the elastic support layer 40 can well support the first display substrate 10 and the second display substrate 20 in the peripheral area 03 to avoid the deformation of the first display substrate 10.

Various materials may be used to make the spacer layer 60. Optionally, the spacer layer 60 and the elastic support layer 40 include a same material. For example, the spacer layer 60 and the elastic support layer 40 include resin.

In some embodiments, the elastic support layer 40 and the spacer layer 60 are in a same layer. Optionally, the spacer layer 60 can be formed on a side of the second display substrate 20 closer to the first display substrate 10. Optionally, the spacer layer 60 can be formed on a side of the first display substrate 10 closer to the second display substrate 20. Since the elastic support layer 40 and the spacer layer 60 are in a same layer, the elastic support layer 40 can be formed either on the side of the second display substrate 20 closer to the first display substrate 10 or on the side of the first display substrate 10 closer to the second display substrate 20.

As used herein, the term "same layer" refers to the relationship between the layers simultaneously formed in the same step. In one example, the elastic support layer 40 and the spacer layer 60 are in a same layer when they are formed as a result of one or more steps of a same patterning process performed in a same layer of material. In another example, the elastic support layer 40 and the spacer layer 60 can be formed in a same layer by simultaneously performing the step of forming the elastic support layer 40 and the step of forming the spacer layer 60. The term "same layer" does not always mean that the thickness of the layer or the height of the layer in a cross-sectional view is the same.

In some embodiments, the elastic support layer 40 and the spacer layer 60 are in a same layer and include a same material. The elastic support layer 40 and the spacer layer 60 can be formed as a result of one or more steps of a same patterning process performed in a same layer of material, which may simplify the fabricating method of the display panel 01.

Figure 10:
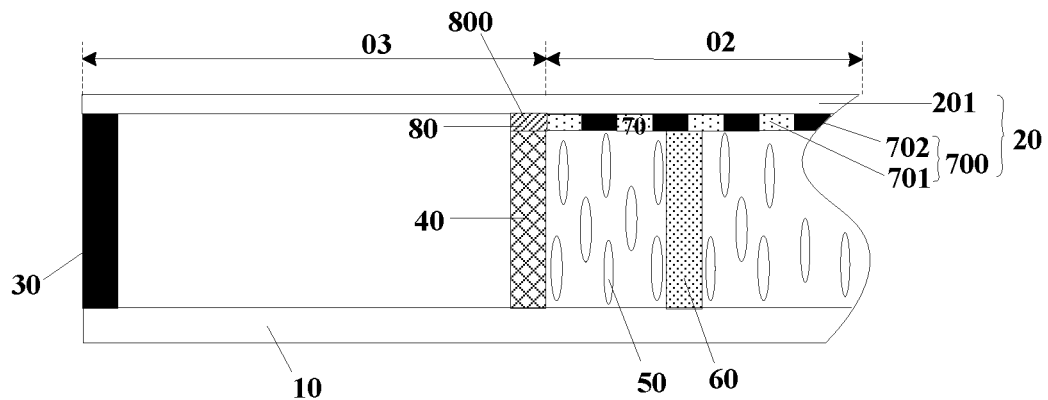
FIG. 10 is a partial cross-sectional view of a display panel in some embodiments according to the present disclosure.
Figure 11:
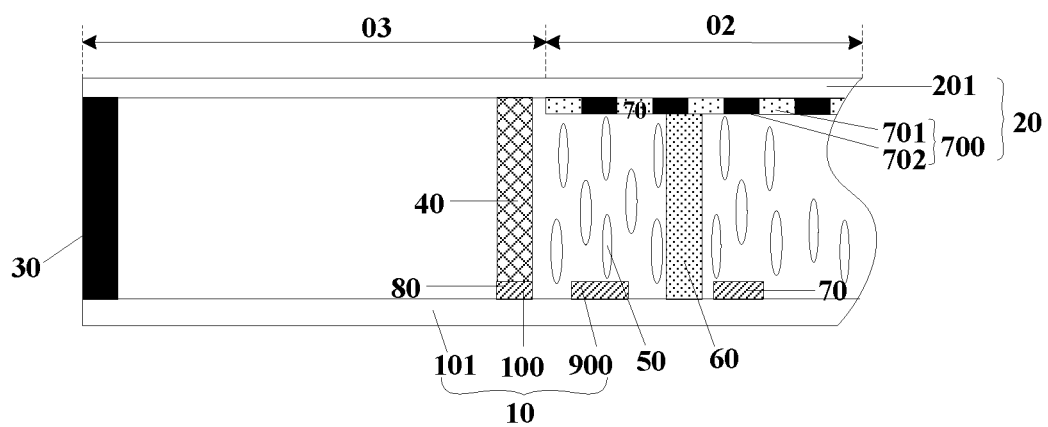
FIG. 11 is a partial cross-sectional view of a display panel in some embodiments according to the present disclosure.

FIG. 10 is a partial cross-sectional view of a display panel in some embodiments according to the present disclosure. FIG. 11 is a partial cross-sectional view of a display panel in some embodiments according to the present disclosure. Referring to both FIG. 10 and FIG. 11, in some embodiments, at least one of the first display substrate 10 and the second display substrate 20 includes a pillow layer 80 for enhancing a thickness of the at least one of the first display substrate 10 and the second display substrate 20. Optionally, an orthographic projection of the pillow layer 80 on the first display substrate 10 at least partially overlaps with an orthographic projection of the elastic support layer 40 on the first display substrate 10. As used herein, the term "partially overlaps" refers to more than 0% but less than 100% overlaps. As used herein, the term "at least partially overlaps" refers to more than 0% (e.g., can be 100%) overlaps.

Optionally, referring to FIG. 10, the pillow layer 80 includes a first pillow 800 in the peripheral area 03. Optionally, referring to FIG. 11, the pillow layer 80 includes a second pillow 100 in the peripheral area 03.

Optionally, referring to FIG. 10, an orthographic projection of the first pillow 800 on the first display substrate 10 at least partially overlaps with the orthographic projection of the elastic support layer 40 on the first display substrate 10. For example, the orthographic projection of the first pillow 800 on the first display substrate 10 covers the orthographic projection of the elastic support layer 40 on the first display substrate 10. Optionally, referring to FIG. 11, an orthographic projection of the second pillow 100 on the first display substrate 10 at least partially overlaps with the orthographic projection of the elastic support layer 40 on the first display substrate 10. For example, the orthographic projection of the second pillow 100 on the first display substrate 10 covers with the orthographic projection of the elastic support layer 40 on the first display substrate 10.

Optionally, the first pillow 800 is formed on a side of the second display substrate 20 closer to the first display substrate 10. It is not necessary to form a second pillow 100 on a side of the first display substrate 10 closer to the second display substrate 20. Optionally, the second pillow 100 is formed on the side of the first display substrate 10 closer to the second display substrate 20. It is not necessary to form the first pillow 800 on a side of the second display substrate 20 closer to the first display substrate 10. Optionally, the first pillow 800 is formed on the side of the second display substrate 20 closer to the first display substrate 10, and the second pillow 100 is formed on the side of the first display substrate 10 closer to the second display substrate 20.

In some embodiments, the elastic support layer 40 is configured to be in direct contact with the pillow layer 80 to be in a compressed state. Optionally, the elastic support layer 40 is configured to be in direct contact with the first pillow 800. Optionally, the elastic support layer 40 is configured to be in direct contact with the second pillow 100. Optionally, the elastic support layer 40 is configured to be in direct contact with both the first pillow 800 and the second pillow 100.

In some embodiments, the elastic support layer 40 is formed on a side of the pillow layer 80. In one example, the elastic support layer 40 is formed on a side of the first pillow 800 away from the second display substrate 20. In another example, the elastic support layer 40 is formed on a side of the second pillow 100 away from the first display substrate 10. In another example, the elastic support layer 40 is formed between the first pillow 800 and second pillow 100. The amount of compression of the elastic support layer 40 is increased due to the pillow layer 80, which may improve the support of the elastic support layer 40 supporting the first display substrate 10 and the second display substrate 20.

In some embodiments, referring to FIG. 10 and FIG. 11, at least one of the first display substrate 10 and the second display substrate 20 includes a patterned layer 70 in the display area 02. Referring to FIG. 10, the patterned layer 70 includes a first pattern sublayer 700 on a side of the liquid crystal layer 50 closer to the second display substrate 20 in the display area 02. Referring to FIG. 11, the patterned layer 70 include a second pattern sublayer 900 on a side of the liquid crystal layer 50 closer to the first display substrate 10 in the display area 02.

Various materials may be used to make the patterned layer 70. Optionally, the patterned layer 70 and the pillow layer 80 include a same material. In one example, the first patterned sublayer 700 and the first pillow 800 include a same material. In another example, the second patterned sublayer 900 and the second pillow 100 include a same material.

In some embodiments, the pillow layer 80 is in a same layer as the pattern layer 70 in the at least one of the first display substrate 10 and the second display substrate 20. In one example, the pillow layer 80 and the patterned layer 70 are in a same layer when they are formed as a result of one or more steps of a same patterning process performed in a same layer of material. In another example, the pillow layer 80 and the patterned layer 70 can be formed in a same layer by simultaneously performing the step of forming the pillow layer and the step of forming the patterned layer. The term "same layer" does not always mean that the thickness of the layer or the height of the layer in a cross-sectional view is the same.

Optionally, the first pillow 800 and the first patterned sublayer 700 are formed in a same layer. Optionally, the second pillow 100 and the second pattern sublayer 900 are formed in a same layer.

Since the pillow layer 80 and the patterned layer 70 are in a same layer and include a same material. The pillow layer 80 and the patterned layer 70 can be formed as a result of one or more steps of a same patterning process performed in a same layer of material, which may simplify the fabricating method of the display panel 01.

In some embodiments, referring to FIG. 10, the first pillow 800 in the peripheral area 03 and the first patterned sublayer 700 in the display area 02 are made of different materials. Optionally, the first pillow 800 in the peripheral area 03 and the first patterned sublayer 700 in the display area 02 are made of a same material. When the first pillow 800 in the peripheral area 03 and the first patterned sublayer 700 in the display area 02 are made of a same material, in one example, the first pillow 800 and the first patterned sublayer 700 are formed as a result of one or more steps of a same patterning process performed in a same layer of material. In another example, the first pillow 800 and the first patterned sublayer 700 are formed as a result of two independent patterning process performed in a same layer of material.

In some embodiments, referring to FIG. 11, the second pillow 100 in the peripheral area 03 and the second patterned sublayer 900 in the display area 02 are made of different materials. Optionally, the second pillow 100 in the peripheral area 03 and the second patterned sublayer 900 in the display area 02 are made of a same material. When the second pillow 100 in the peripheral area 03 and the second patterned sublayer 900 in the display area 02 are made of a same material, in one example, the second pillow 100 and the second patterned sublayer 900 are formed as a result of one or more steps of a same patterning process performed in a same layer of material. In another example, the second pillow 100 and the second patterned sublayer 900 are formed as a result of two independent patterning process performed in a same layer of material.

In some embodiments, the second display substrate includes one first pillow. Optionally, the second display substrate includes two or more first pillows sequentially stacked. When the second display substrate includes two or more first pillows, a number of the first patterned layers included in the second display substrate is equivalent of a number of the first pillows. Optionally, a respective one of the first pillows has a same material as a respective one of the first patterned layers. For example, when the second display substrate includes two first pillows sequentially stacked, the second display substrate also include two first patterned layers sequentially stacked. One of the first patterned layers is a color filter layer. The other one of the first patterned layers is a black matrix layer. A respective one of the first pillows is in a same layer as the color filter layer and includes a same material as the color filter layer. The other respective one of the first pillows is in a same layer as the black matrix layer and includes a same material as the black matrix layer.

In some embodiments, the first display substrate includes one second pillow. Optionally, the first display substrate includes two or more second pillows sequentially stacked. When the first display substrate includes two or more second pillows, a number of the second patterned layers included in the first display substrate is equivalent of a number of the second pillows. Optionally, a respective one of the second pillows has a same material as a respective one of the second patterned layers. For example, when the first display substrate includes two second pillows sequentially stacked, the first display substrate also include two second patterned layers sequentially stacked. One of the second patterned layers is a gate line layer. The other one of the second patterned layers is a data line layer. A respective one of the second pillows is in a same layer as the gate line layer and includes a same material as the gate line layer. The other respective one of the second pillows is in a same layer as the data line layer and includes a same material as the data line layer.

In some embodiments, the pillow layer 80 has a thickness greater than that of the patterned layer 70. Optionally, the first pillow 800 has a thickness greater than that of the first patterned sublayer 700. Optionally, the second pillow 100 has a thickness greater than the second patterned sublayer 900.

In some embodiments, the patterned layer 70 is selected from a group consisting of a color filter layer, a black matrix layer, a gate line, and a data line.

In some embodiments, referring to FIG. 10, when the second display substrate 20 includes a color filter layer 701 and black matrix layer 702 spacing apart two adjacent blocks of the color filter layer 701, the first patterned sublayer 700 may include at least one of the color filter layer 701 and the black matrix layer 702. Optionally, the color filter layer 701 includes a red color filter block, a blue color filter block, and a green color filter block.

In some embodiments, referring to FIG. 11, when the first display substrate include a gate line and a data line, the second patterned sublayer 900 include at least of the gate line and the data line.

In some embodiments, referring to FIG. 10, the second display substrate 20 further includes a second base substrate 201. Optionally, the first pillow 800 and the first pattern sublayer 700 is formed on a side of the second base substrate 201 closer to the first display substrate 10.

In some embodiments, referring to FIG. 11, the first display substrate 10 further includes a first base substrate 101. Optionally, the second pillow 100 and the second pattern sublayer 900 is formed on a side of the first base substrate 101 closer to the second display substrate 20.

In some embodiments, at least one of the first display substrate and the second display substrate includes an integral layer. Optionally, a portion of the integral layer in the peripheral area constitutes the pillow layer. Optionally, the integral layer is a layer continuously extending from the display area into the peripheral area. Optionally, the integral layer has a first thickness in the portion constituting the pillow layer and a second thickness in the display area. Optionally, the first thickness is greater than the second thickness.

Figure 12:
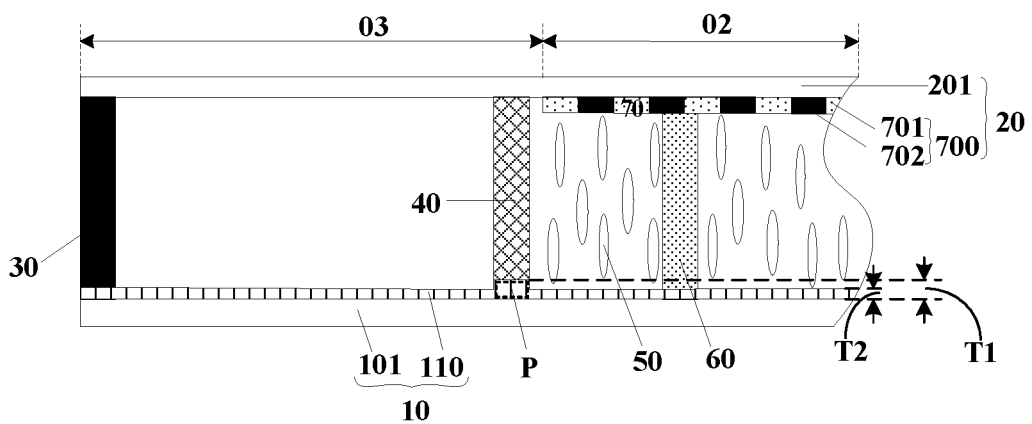
FIG. 12 is a partial cross-sectional view of a display panel in some embodiments according to the present disclosure.

FIG. 12 is a partial cross-sectional view of a display panel in some embodiments according to the present disclosure. Referring to FIG. 12, the first display substrate 10 include an integral layer 110. Optionally, a portion P of the integral layer 110 in the peripheral area 03 constitutes the pillow layer 80. Optionally, the orthographic projection of the elastic support layer 40 on the first display substrate 10 at least partially overlaps with an orthographic of the portion P of the integral layer 110 constituting the pillow layer 80. Optionally, the orthographic of the portion P of the integral layer 110 constituting the pillow layer 80 covers the orthographic projection of the elastic support layer 40 on the first display substrate 10.

In some embodiments, the portion P of the integral layer 110 constituting the pillow layer 80 has a first thickness T1 greater than a thickness of the remaining portion of the integral layer 110 except for the portion P. For example, the integral layer 110 has a first thickness T1 in the portion P constituting the pillow layer 80 and a second thickness T2 in the display area 02. The first thickness T1 is greater than the second thickness T2.

In some embodiments, the integral layer 110 is selected from a group consisting of a planarization layer, a passivation layer, a gate insulating layer, an inter-layer dielectric layer, and a buffer layer. In one example, the integral layer 110 is a planarization layer. In another example, the integral layer 110 includes a planarization layer and a passivation layer.

In some embodiments, the orthographic projection of the elastic support layer 40 on the first display substrate 10 at least partially overlaps with an orthographic of the portion P of the integral layer 110 constituting the pillow layer 80. So, the elastic support layer 40 is formed on a side of the portion P of the integral layer 110 constituting the pillow layer 80 away from the first display substrate 10. Because the first thickness T1 is greater than the second thickness T2, the amount of compression of the elastic support layer 40 is increased. For example, the amount of compression of the elastic support layer 40 is greater than the that of the spacer layer 60.

In another aspect, the present disclosure also provides a display apparatus. The display apparatus include the display panel 01 described herein. and one or more integrated circuits connected to the display panel. Examples of appropriate display apparatuses include, but are not limited to, an electronic paper, a mobile phone, a tablet computer, a television, a monitor, a notebook computer, a digital album, a GPS, etc.

Optionally, the display apparatus further includes a back light.

In another aspect, the present disclosure also provides a method of fabricating a display panel having a display area and a peripheral area. In some embodiments, the method of fabricating a display panel having a display area and a peripheral area includes providing a first display substrate and a second display substrate; forming a sealant layer in the peripheral area and between the first display substrate and the second display substrate, sealing the first display substrate and the second display substrate together to form a cell; forming an elastic support layer in the peripheral area and between the first display substrate and the second display substrate. Optionally, the elastic support layer is formed to be encircled by the sealant layer and spaced apart from the sealant layer. Optionally, the elastic support layer is formed to substantially surround the display area. Optionally, the elastic support layer is formed to be in direct contact with the first display substrate and in direct contact with the second display substrate.

In some embodiments, the elastic support layer is configured to be a valve for liquid crystal molecules. Optionally, the elastic support layer is fixedly attached to one of the first display substrate and the second display substrate, and is compressedly attached to another of the first display substrate and the second display substrate. Optionally, when the display panel is in a first state having a first cell gap between the first display substrate and the second display substrate, the elastic support layer is in a relatively more compressed state when the display panel is in the first state. Optionally, the elastic support layer is spaced apart from the another of the first display substrate and the second display substrate when the display panel is in a second state having a second cell gap between the first display substrate and the second display substrate, the elastic support layer is in a relatively more relaxed state when the display panel is in the second state, the second cell gap being greater than the first cell gap.

In some embodiments, the method of fabricating the display panel further includes forming a liquid crystal layer between the first display substrate and the second display substrate, and filling in the cell. Optionally, the elastic support layer completely surrounds the display area to form a first space and a second space. Optionally, the first space is formed between the sealant layer and the elastic support layer. Optionally, the second space is formed to be encircled by the elastic support layer. Optionally, the first space is at least partially free of liquid crystal molecules when the display panel is in the first state.

Optionally, the first space is completely free of liquid crystal molecules display panel is in the first state.

Optionally, when the display panel is in the second state, the elastic support layer is spaced apart from the another of the first display substrate and the second display substrate, allowing fluid communication between the first space and the second space. Optionally, the first space is at least partially filled with liquid crystal molecules when the display panel is in the second state.

Optionally, the display panel is in the second state such that gravity pulls the liquid crystal molecules downward thereby spacing apart the elastic support layer from the another of the first display substrate and the second display substrate, allowing the liquid crystal molecules to flow into a space between the elastic support layer and the sealant layer.

Optionally, the elastic support layer is configured to include a plurality of elastic supports substantially surrounding the display area. Optionally, the plurality of elastic supports is configured to include a first elastic support by a first side of the display area. Optionally, the first elastic support extends throughout the first side of the display area, and is longer than the first side.

In some embodiments, the method of fabricating the display panel further include forming a pillow layer. Optionally, at least one of the first display substrate and the second display substrate is configured to include the pillow layer for enhancing a thickness of the at least one of the first display substrate and the second display substrate. Optionally, an orthographic projection of the pillow layer on the first display substrate at least partially overlaps with an orthographic projection of the elastic support layer on the first display substrate.

Optionally, the elastic support layer is configured to be in direct contact with the pillow layer to be in a compressed state.

In some embodiments, the method of fabricating the display panel further include forming a patterned layer. Optionally, the pillow layer is in a same layer as a patterned layer in the at least one of the first display substrate and the second display substrate and includes a same material as the patterned layer.

Optionally, the patterned layer is selected from a group consisting of a color filter layer, a black matrix layer, a gate line, and a data line.

In some embodiments, the method of fabricating the display panel further include forming an integral layer. Optionally, a portion of an integral layer in the peripheral area constitutes the pillow layer; the integral layer is a layer continuously extending from the display area into the peripheral area; the integral layer has a first thickness in the portion constituting the pillow layer and a second thickness in the display area; and the first thickness is greater than the second thickness.

Optionally, integral layer is selected from a group consisting of a planarization layer, a passivation layer, a gate insulating layer, an inter-layer dielectric layer, and a buffer layer.

In some embodiments, the method of fabricating the display panel further include forming spacer layer in the display area and configured to space apart the first display substrate and the second display substrate. Optionally, when the elastic support layer is in direct contact with the first display substrate and in direct contact with the second display substrate, the elastic support layer has a degree of compression greater than that of the spacer layer.

Optionally, the elastic support layer and the spacer layer are in a same layer and include a same material.

In another aspect, the present disclosure further provides an operating method of operating a display panel having a display area and a peripheral area. In some embodiments, the display panel includes a first display substrate; a second display substrate facing the first display substrate; a sealant layer in the peripheral area and between the first display substrate and the second display substrate, configured to seal the first display substrate and the second display substrate together to form a cell; an elastic support layer in the peripheral area and between the first display substrate and the second display substrate, the elastic support layer encircled by the sealant layer and spaced apart from the sealant layer; and a liquid crystal layer between the first display substrate and the second display substrate, and filling in the cell. Optionally, the elastic support layer substantially surrounds the display area. Optionally, the elastic support layer is configured to be in direct contact with the first display substrate and in direct contact with the second display substrate.

In some embodiments, the operating method includes using the elastic support layer as a valve for controlling a fluid communication of liquid crystal molecules between a first space between the sealant layer and the elastic support layer and a second space encircled by the elastic support layer.

In some embodiments, the operating method further includes controlling the elastic support layer in a closed valve state, in which the elastic support layer is fixedly attached to one of the first display substrate and the second display substrate, and is compressedly attached to another of the first display substrate and the second display substrate when the display panel is in a first state having a first cell gap between the first display substrate and the second display substrate, the elastic support layer is in a relatively more compressed state when the display panel is in the first state; and controlling the elastic support layer in an open valve state, in which the elastic support layer is spaced apart from the another of the first display substrate and the second display substrate when the display panel is in a second state having a second cell gap between the first display substrate and the second display substrate, the elastic support layer is in a relatively more relaxed state when the display panel is in the second state, the second cell gap being greater than the first cell gap.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display panel having a display area and a peripheral area, comprising:
    a first display substrate;
    a second display substrate facing the first display substrate;
    a sealant layer in the peripheral area and between the first display substrate and the second display substrate, configured to seal the first display substrate and the second display substrate together to form a cell; and
    an elastic support layer in the peripheral area and between the first display substrate and the second display substrate, the elastic support layer encircled by the sealant layer and spaced apart from the sealant layer;
    wherein the elastic support layer substantially surrounds the display area; and
    the elastic support layer is configured to be in direct contact with the first display substrate and in direct contact with the second display substrate;
    wherein the elastic support layer is a valve for liquid crystal molecules;
    the elastic support layer is fixedly attached to one of the first display substrate and the second display substrate, and is compressedly attached to another of the first display substrate and the second display substrate when the display panel is in a first state having a first cell gap between the first display substrate and the second display substrate, the elastic support layer is in a relatively more compressed state when the display panel is in the first state; and
    the elastic support layer is spaced apart from the another of the first display substrate and the second display substrate when the display panel is in a second state having a second cell gap between the first display substrate and the second display substrate, the elastic support layer is in a relatively more relaxed state when the display panel is in the second state, the second cell gap being greater than the first cell gap.

2. The display panel of claim 1, further comprising a liquid crystal layer between the first display substrate and the second display substrate, and filling in the cell;
    wherein the elastic support layer completely surrounds the display area, forming a first space and a second space;
    the first spaced is formed between the sealant layer and the elastic support layer;
    the second space is formed to be encircled by the elastic support layer; and
    the first space is at least partially free of liquid crystal molecules when the display panel is in the first state.

3. The display panel of claim 2, wherein the first space is completely free of liquid crystal molecules display panel is in the first state.

4. The display panel of claim 2, wherein, when the display panel is in the second state, the elastic support layer is spaced apart from the another of the first display substrate and the second display substrate, allowing fluid communication between the first space and the second space; and
    the first space is at least partially filled with liquid crystal molecules when the display panel is in the second state.

5. The display panel of claim 1, wherein the display panel is in the second state such that gravity pulls the liquid crystal molecules downward thereby spacing apart the elastic support layer from the another of the first display substrate and the second display substrate, allowing the liquid crystal molecules to flow into a space between the elastic support layer and the sealant layer.

6. The display panel of claim 1, wherein the elastic support layer comprises a plurality of elastic supports substantially surrounding the display area.

7. The display panel of claim 6, wherein the plurality of elastic supports comprise a first elastic support by a first side of the display area; and
    the first elastic support extends throughout the first side of the display area, and is longer than the first side.

8. The display panel of claim 1, wherein at least one of the first display substrate and the second display substrate comprises a pillow layer for enhancing a thickness of the at least one of the first display substrate and the second display substrate; and
    an orthographic projection of the pillow layer on the first display substrate at least partially overlaps with an orthographic projection of the elastic support layer on the first display substrate.

9. The display panel of claim 8, wherein the elastic support layer is configured to be in direct contact with the pillow layer to be in a compressed state.

10. The display panel of claim 8, wherein the pillow layer is in a same layer as a patterned layer in the at least one of the first display substrate and the second display substrate and comprises a same material as the patterned layer.

11. The display panel of claim 10, wherein the patterned layer is selected from a group consisting of a color filter layer, a black matrix layer, a gate line, and a data line.

12. The display panel of claim 8, wherein a portion of an integral layer in the peripheral area constitutes the pillow layer;
    the integral layer is a layer continuously extending from the display area into the peripheral area;
    the integral layer has a first thickness in the portion constituting the pillow layer and a second thickness in the display area; and
    the first thickness is greater than the second thickness.

13. The display panel of claim 12, wherein the integral layer is selected from a group consisting of a planarization layer, a passivation layer, a gate insulating layer, an interlayer dielectric layer, and a buffer layer.

14. The display panel of claim 1, further comprising a spacer layer in the display area and configured to space apart the first display substrate and the second display substrate;
    wherein, when the elastic support layer is in direct contact with the first display substrate and in direct contact with the second display substrate, the elastic support layer has a degree of compression greater than that of the spacer layer.

15. The display panel of claim 14, wherein the elastic support layer and the spacer layer are in a same layer and comprise a same material.

16. A display apparatus, comprising the display panel of claim 1.

17. A method of fabricating a display panel having a display area and a peripheral area, comprising:
    providing a first display substrate and a second display substrate;
    forming a sealant layer in the peripheral area and between the first display substrate and the second display substrate, sealing the first display substrate and the second display substrate together to form a cell; and
    forming an elastic support layer in the peripheral area and between the first display substrate and the second display substrate, the elastic support layer formed to be encircled by the sealant layer and spaced apart from the sealant layer;

wherein the elastic support layer is formed to substantially surround the display area; and the elastic support layer is formed to be in direct contact with the first display substrate and in direct contact with the second display substrate;

wherein the elastic support layer is a valve for liquid crystal molecules;

the elastic support layer is fixedly attached to one of the first display substrate and the second display substrate, and is compressedly attached to another of the first display substrate and the second display substrate when the display panel is in a first state having a first cell gap between the first display substrate and the second display substrate, the elastic support layer is in a relatively more compressed state when the display panel is in the first state; and the elastic support layer is spaced apart from the another of the first display substrate and the second display substrate when the display panel is in a second state having a second cell gap between the first display substrate and the second display substrate, the elastic support layer is in a relatively more relaxed state when the display panel is in the second state, the second cell gap being greater than the first cell gap.

18. An operating method of operating a display panel having a display area and a peripheral area, wherein the display panel comprises:

a first display substrate;

a second display substrate facing the first display substrate;

a sealant layer in the peripheral area and between the first display substrate and the second display substrate, configured to seal the first display substrate and the second display substrate together to form a cell;

an elastic support layer in the peripheral area and between the first display substrate and the second display substrate, the elastic support layer encircled by the sealant layer and spaced apart from the sealant layer; and a liquid crystal layer between the first display substrate and the second display substrate, and filling in the cell;

wherein the elastic support layer substantially surrounds the display area; and the elastic support layer is configured to be in direct contact with the first display substrate and in direct contact with the second display substrate;

wherein the operating method comprises:

using the elastic support layer as a valve for controlling a fluid communication of liquid crystal molecules between a first space between the sealant layer and the elastic support layer and a second space encircled by the elastic support layer.

19. The operating method of claim 18, further comprising:

controlling the elastic support layer in a closed valve state, in which the elastic support layer is fixedly attached to one of the first display substrate and the second display substrate, and is compressedly attached to another of the first display substrate and the second display substrate when the display panel is in a first state having a first cell gap between the first display substrate and the second display substrate, the elastic support layer is in a relatively more compressed state when the display panel is in the first state; and controlling the elastic support layer in an open valve state, in which the elastic support layer is spaced apart from the another of the first display substrate and the second display substrate when the display panel is in a second state having a second cell gap between the first display substrate and the second display substrate, the elastic support layer is in a relatively more relaxed state when the display panel is in the second state, the second cell gap being greater than the first cell gap.

* * * * *